United States Patent

Kempf

[15] 3,693,114

[45] Sept. 19, 1972

[54] CABLE SECTIONS WITH NONMECHANICAL MEANS TO EFFECT COUPLING

[72] Inventor: Raymond Andrew Kempf, Towson, Md.

[73] Assignee: Bell Telephone Laboratories, Incorporated, Murray Hill, N.J.

[22] Filed: June 7, 1971

[21] Appl. No.: 150,591

Related U.S. Application Data

[62] Division of Ser. No. 881,976, Dec. 4, 1969.

[52] U.S. Cl. .........................333/7, 333/24 C, 333/27

[51] Int. Cl. ...............................................H01p 5/14

[58] Field of Search ...............333/7, 24 C, 27, 70, 74

[56] References Cited

UNITED STATES PATENTS

| | | | |
|---|---|---|---|
| 3,027,524 | 3/1962 | May | 333/7 |
| 3,061,680 | 10/1962 | Frankel | 333/7 X |
| 3,110,004 | 11/1963 | Pope | 333/77 X |
| 3,146,357 | 8/1964 | Spallone | 333/7 X |
| 3,201,716 | 8/1965 | Giger | 333/7 X |
| 3,205,493 | 9/1965 | Cohen | 333/7 X |
| 3,503,014 | 3/1970 | Hall et al. | 333/7 |
| 3,503,015 | 3/1970 | Coraccio et al. | 333/7 |
| 3,533,020 | 10/1970 | Hecht | 333/70 R |
| 3,564,463 | 2/1971 | Beaver et al. | 333/74 X |
| 3,593,205 | 7/1971 | Coraccio et al. | 333/7 |

*Primary Examiner*—John S. Heyman
*Attorney*—R. J. Guenther and Edwin B. Cave

[57] ABSTRACT

This disclosure describes a scheme for interconnecting telephone cable pairs at a cable junction using remotely controlled devices.

A material with a dielectric constant that can be varied by applied electrical bias is employed as the dielectric of capacitors connected in a lattice. The lattice permits transmission of an ac signal between two pairs when the bias is adjusted to provide an unbalanced condition; or alternatively, blocks transmission when the bias balances the lattice.

1 Claim, 2 Drawing Figures

INVENTOR
R. A. KEMPF
BY Charles E. Graves
ATTORNEY

CABLE SECTIONS WITH NONMECHANICAL MEANS TO EFFECT COUPLING

CROSS REFERENCE TO RELATED APPLICATION

This application is a division of my copending application, Ser. No. 881,976, filed Dec. 4, 1969,

FIELD OF THE INVENTION

This invention relates to multipair telephone subscriber cable; and particularly to the electrical coupling of sections of such cable without resort to mechanical connections between the corresponding pairs.

BACKGROUND OF THE INVENTION

Presently, substantially all electrical connections between sections of multipair cable are mechanical in nature. These include the familiar pair splices, and screw or quick-connect terminals. A large body of technology has evolved to perfect such physical connections; and reliable, inexpensive apparatus has resulted.

Yet, the traditional mechanical coupling of conductors to form pairs is not compatible with needs now being formulated for tomorrow's telephone cable plant. For example, with both new plant and rearrangement of existing cable connections ever on the increase, the sheer time required to complete mechanical linkages, such as drops, becomes an important cost factor. Further, cable hermetic integrity is often subject to risk under current mechanical splice procedures; and as transmission requirements become more stringent, this risk is less and less tolerable.

Accordingly, the following are important objects of the invention:

to facilitate the coupling of multipair telephone cable sections in the field;

to simplify the placing of drops from a cable; and to better ensure hermetic integrity of multipair cables during splicing operations.

SUMMARY OF THE INVENTION

The invention broadly contemplates cable sections which are mechanically linked at a sealed terminal. Within the terminal housing, each of the respective conductor pairs terminates in an appropriate device which responds to signals present in an associated conductor pair. For example, in one embodiment a material with a dielectric constant that can be varied by applied electrical bias is employed as the dielectric of capacitors connected in a lattice. The lattice permits transmission of an ac signal between two pairs when the bias is adjusted to provide an unbalanced condition; or alternatively, blocks transmission when the bias balances the lattice.

Advantageously, pursuant to this invention, subscriber drops are effected by remote redirecting of the transmission path by electrical switching of the device. The electric field which effects the switching is controlled as through a biasing pair originating in a central office; or may be governed over a shorter path from the terminal exterior.

A principal feature of the invention, accordingly, is a remotely controlled switching device for effecting rearrangements of connections at a cable pair "splice point."

An added feature of the invention is a nonmechanical switching device for use with pairs at cable junction terminals.

The invention and its further objects, features, and advantages will be fully appreciated from a reading of the description to follow of an illustrative embodiment.

DETAILED DESCRIPTION OF AN ILLUSTRATIVE EMBODIMENT

Figure 1:
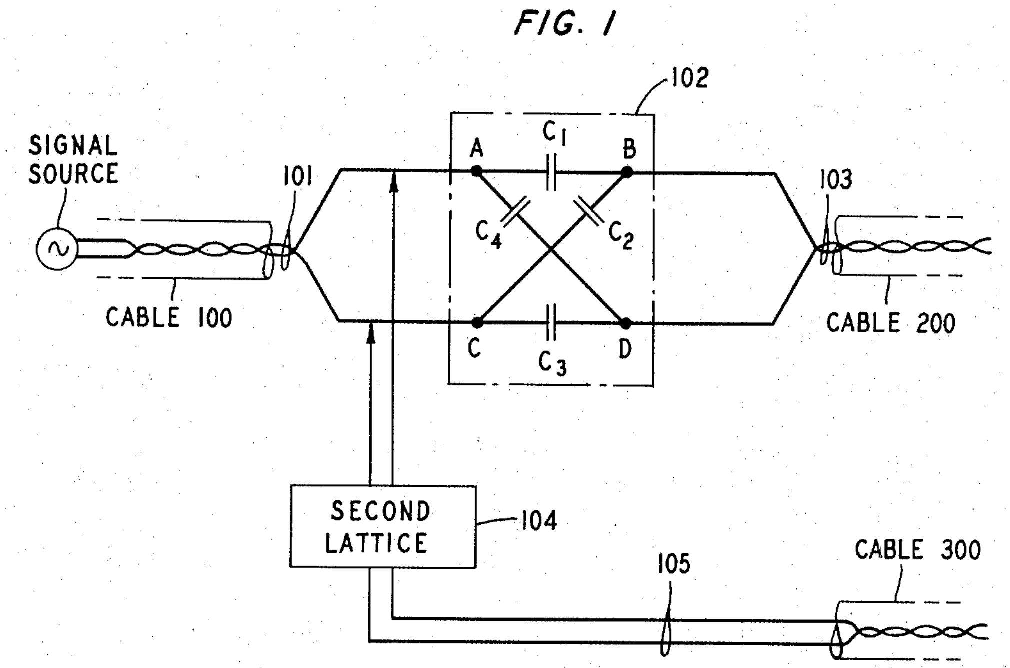
FIG. 1 is a circuit schematic diagram of a cable junction embodying the invention.
Figure 2:
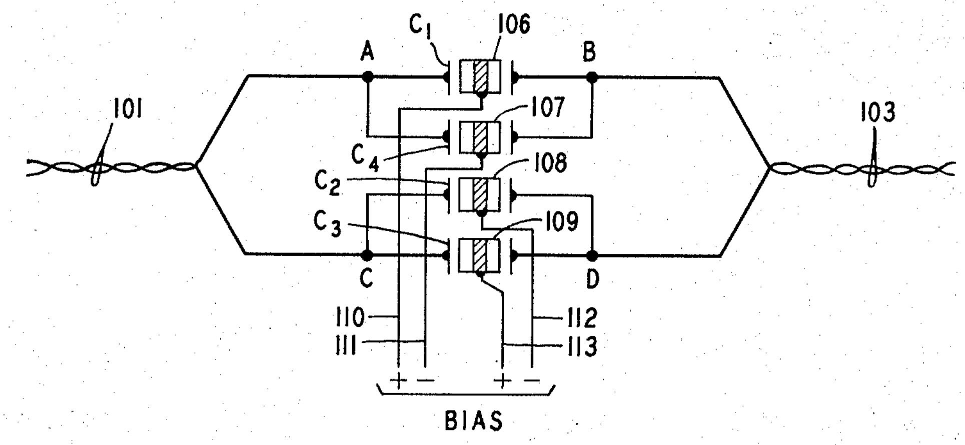
FIG. 2 is a circuit schematic diagram detailing a portion of the FIG. 1 circuit.

As depicted in FIGS. 1 and 2, advantage is gained from the fact that the dielectric constant of certain materials can be shifted by a varying bias. For example, selected crystals of the potassium tantalate-niobate system (KTN) when employed as the dielectric of capacitors connected in a lattice as shown in FIG. 1, afford a way of controlling transmission from cable 1 to either cable 2 or cable 3. Device elements within the KTN system are taught in J. E. Geusic et al., U.S. Pat. No. 3,290,619, assigned to applicant's assignee.

The system depicted in FIG. 1 is a junction of three cables 100, 200, and 300. Each pair in cable 100, such as a pair 101, is bridged by a capacitive lattice 102 to a corresponding conductor pair such as 103 in cable 200; and by a similar lattice 104, to a conductor pair 105 of cable 300. The lattice 102 consists of capacitors C1, C2, C3, and C4 connecting points A, B, C, and D as shown. The lattice 104 is substantially the same as lattice 102.

As seen in FIG. 2, KTN crystals 106–109 serve as the dielectric of capacitors C1–C4. The crystals 106–109 are formed as taught, for example, in connection with FIG. 8 of the aforementioned Geusic et al., U.S. Pat. No. 3,290,609. Leads 110, 111, 112, and 113 are connected to the respective crystals 106–109 to provide a way to suitably bias each of the capacitors C1–C4.

It will readily be appreciated that the lattice 102 permits transmission of an ac signal from pair 101 to pair 103 if the bias from leads 110 through 113 is adjusted to provide an unbalanced condition in the lattice 102. Alternatively, if the bias is adjusted so that the relationship $C1 = C2 = C3 = C4$ is satisfied, transmission from pair 101 to 103 is precluded.

If an ac bias is used, amplitude modulation can be introduced at the bias frequency as a means of blocking portions of a multiplexed signal. The bias signal is coded to block the particular portion; and the code is controlled if desired from a remote central office.

The lattice 102 is useful, therefore, in stopping transmission altogether across the designated path and thus may be employed as a switch to commence or terminate service to a household. The second lattice 104 can, in association with lattice 102, be biased to redirect the signal from pair 101 to pair 105 of cable 300. This scheme can readily be extended to connect all the pairs of one cable to corresponding pairs of a second cable or of course, to other pairs within the first cable.

The spirit of the invention is embraced in the claims to follow.

What is claimed is:

1. At a multipair voice frequency telephone cable junction, apparatus for controlling a connection between a first conductor pair and a second conductor pair including:

an on-off switch between said first and second pairs including a capacitive lattice consisting of capacitor elements connecting each conductor of said first pair with both conductors of said second pair, each said element being composed of potassium tantalate-niobate capable of undergoing a change in dielectric constant in response to a change in applied electrical bias, and means for applying a bias signal to each said element to adjust said dielectric constant of said element to a desired value, said values in aggregate being determinative of the on-off condition of said connection between said first and second pairs.

* * * * *